United States Patent Office

2,776,981
Patented Jan. 8, 1957

2,776,981

PROCESS AND CATALYST FOR THE PREPARATION OF FURAN FROM FURFURAL

Leo W. Tyran, Niagara Falls, N. Y., assignor to E. I. du Pont de Nemours and Company, Wilmington, Del., a corporation of Delaware No Drawing. Application March 2, 1954,
Serial No. 413,719

12 Claims. (Cl. 260—346.1)

This invention relates to the decarbonylation of aldehydes. More particularly it relates to the formation of a catalyst and to a process using the catalyst to convert furfural to furan.

This application is a continuation-in-part of my copending application Serial Number 276,460, filed March 13, 1952, now abandoned.

BACKGROUND AND OBJECTS OF THE INVENTION

There is disclosed in the Whitman U. S. Patent 2,374,149 (1945) a method for converting furfural to furan by vapor-phase decarbonylation in the presence of steam by means of a catalyst composed of mixed zinc and iron chromites. The overall equation for this decarbonylation reaction may be written as:

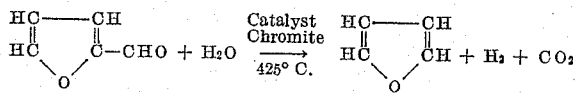

The patented method of effecting the conversion is one of the best currently available, the patent disclosing yields of about 85%. Further tests of the process have revealed that yields of about 87.5% can be obtained with careful control. These latter yields are, however, about the maximum to be expected under the most favorable conditions.

It is accordingly an object of the invention to develop a new and improved catalytic process for the decarbonylation of aldehydes. Another object is development of an improved catalytic process for the conversion of furfural to furan. Still another object of the invention is production of a new and improved catalyst for converting furfural to furan in high yield. A further object is development of a process for making an improved catalyst for the decarbonylation of furfural to furan. Still further objects of the invention will be apparent from the remainder of this specification.

GENERAL STATEMENT OF INVENTION

It has now been discovered that the above-mentioned objects of the invention may be accomplished by a process utilizing in the desired decarbonylation reaction a pelleted chromite catalyst promoted by the addition thereto of an alkali metal ion such as that of sodium or potassium. Several methods for effecting the addition of the alkali metal ion are available but the catalysts produced by these various methods are employed according to the principles of this invention in essentially the same manner. Up to at least 5% of a compound of the selected alkali metal may be easily supplied to the catalyst by any of the addition methods enumerated hereinafter but best results in the decarbonylation are obtained if not more than 3% and generally less than this amount is added.

In one mode of promoting the catalyst a pelletized chromite, as for example one analyzing 90 mole percent zinc chromite and 10 mole percent iron chromite, is steeped in an aqueous solution of a compound, usually the carbonate, of potassium or other alkali metal and thereby impregnated with the dissolved compound. The concentration of this solution is generally predetermined to yield a catalyst containing 0.6–1%, based on the dry weight of the original catalyst, of promoter considered as potassium carbonate. An optimum activity is found in a catalyst impregnated with about 0.65–0.85% potassium carbonate. As noted above, larger quantities of promoter can be added but, in the case of the impregnated materials, tend to give impaired results. Since as little as 0.1% of the promoter may show some improvement in yield when used in the decarbonylation reaction, the catalyst can advantageously be impregnated with quantities below 0.6%, but better results are obtained between 0.6 and 1%.

In a second and preferred mode of making the catalyst the promoter is incorporated in the catalytic powder before the latter is pelletized. The amount of promoter generally incorporated in the catalyst is roughly in about the same broad range as that added by impregnation, i. e. between about 0.1 and 3%. The preferred quantity incorporated is, however, between 1 and 2%, a slightly larger amount than the 0.6–1% preferred when the promoter is added by impregnation. The optimum range where the promoter is incorporated is about 1.3–1.8%. The differences in weight ranges are probably due to the fact that in a catalyst activated by impregnation most of the promoter remains at the surface of the material while in a catalyst activated by incorporation of the promoter the promoter is distributed uniformly throughout the bulk of the material.

The decarbonylation was accomplished in practice by packing a quantity of catalyst, promoted by any one of the methods described, into a substantially conventional reactor and passing a mixture of furfural and steam therethrough. The reactor consisted of a stainless steel tube about ten feet long and one inch in diameter. The tube was equipped with a vaporizer and a preheater and connected, at its exit end, to a train of condensers maintained successively at 10 and −60° C. The tube was usually heated to the desired reaction temperature by immersion in a fused salt bath. The volume of catalyst employed was generally around 1600 cc. but in some instances was greater.

A series of runs was made with each of several catalysts to determine optimum working conditions, particularly with regard to the concentration of promoter discussed above and the temperature. The optimum temperature, i. e. the temperature giving the best yields of furan, was found to be between about 380° and 390° C. for catalysts made up either by impregnation or by incorporation of the promoter therein. The reaction feed mixture employed in each case contained about ten volumes of steam for each volume of furfural vapors and was passed through the tube at a rate of flow of approximately 1000 v./v./h. Here the abbreviation v./v./h. possesses its usual significance, the volume of gas (measured at standard temperature and pressure) passing through a unit volume of catalyst per hour.

After passage through the reactor, the gaseous mixture consisted largely of furan, steam, carbon monoxide, and hydrogen with minor quantities of other materials. The major portion of the furan and steam was condensed from the mixture and the off-gases scrubbed through methyl "Cellosolve" at −60° C., metered and finally vented to the atmosphere. Samples of the off-gases were specifically analyzed for carbon monoxide, carbon dioxide and unsaturated hydrocarbons. The remainder by difference was assumed to be free hydrogen. The condensed crude product was combined with the methyl "Cellosolve" used for scrubbing the off-gases and carefully distilled. The fraction collected at 30–35° C. was furan obtained from the conversion of furfural and is referred to hereinafter as the yield.

EXAMPLES

The invention will be understood in greater detail from the following examples:

*Example 1.*—This example shows the results obtainable with unpromoted catalyst and is included as a control.

Approximately 2250 grams of pelleted catalyst consisting of 90 mole percent zinc chromite and 10 mole percent iron chromite were charged to the reactor. A mixture of furfural and steam in a mole ratio of about 1:10 was passed through the catalyst heated, as noted above, in a fused salt bath. The reaction temperature was held within the range 420° C.–430° C. to maintain proper off-gas to furfural feed ratio. Analysis showed the off-gas from the condensation train to contain, by volume 48.5% of $CO_2$, 1.7% of CO, and 0.5% of unsaturated hydrocarbons. Distillation of the combined crude product showed an 86.6% conversion of furfural to furan. The total high boiling materials formed was five grams for each mole of furan secured.

*Example 2.*—This example shows the use of a catalyst impregnated with a promotional amount of the potassium ion.

A zinc-iron mixed chromite catalyst with a molar ratio of 90:10 zinc to iron was mixed and pelletized according to the procedure of Example 1 of Whitman. A solution of 40 grams of C. P. potassium carbonate in 1200 ml. of distilled water was poured over 1600 ml. (2200 grams) of the pelletized catalyst and allowed to stand for 3–5 minutes. The excess $K_2CO_3$ solution, 650–700 ml., was then decanted off and the chromite pellets air dried. Analysis at this point showed the $K_2CO_3$ content of the catalyst to be about 0.65–0.7% by weight, equivalent to about 0.37–0.4% of the potassium ion. The decanted solution showed almost the same carbonate concentration as the one initially used.

The activated material was inserted in a 1" x 10' stainless steel coil immersed in the fused salt bath. A series of runs was then carried out passing separate mixtures of 10 volumes of steam and 1 volume of furfural through the catalyst at a rate of about 1010–1020 v./v./h. (S. T. P.). The reaction temperature was varied from run to run to find an optimum. The furan produced was determined according to the method described in Example 1. The yields are based on a single passage of furfural through the reactor and for the lower temperatures could probably be increased by recycling. Results for a series of runs are set forth in:

*Table I.—Effect of temperature variation on potassium impregnated catalyst*

| Run | Temperature (°C.) | Percent Yield (Furan) | High Boiling Fraction |
|---|---|---|---|
| 1 | 440–462 | 79.4 | 5.1 |
| 2 | 423–431 | 86.6 | 3.8 |
| 3 | 414–418 | 88.0 | 3.4 |
| 4 | 402–404 | 89.4 | 3.1 |
| 5 | 394–396 | 89.7 | 2.9 |
| 6 | 382–386 | 90.4 | 2.2 |
| 7 | 373–377 | 89.8 | 2.4 |
| 8 | 386–390 | 89.9 | 1.8 |
| 9 | 385–387 | 90.8 | 2.0 |

Run 9 checked Run 6 after the intermediate runs had been effected and showed that the catalyst had lost none of its activity. The high boiling fraction is equal to the grams of product with a boiling point greater than 35° C. produced for each mole of distilled furan and represents formation of side products.

It will be seen that the use of potassium impregnated chromites improved the yield from the 87–88% obtained with non-impregnated catalyst to 90.4%. In addition the impregnation reduced the temperature required for the conversion in this reactor from 430–450° C. to 380–390° C. While this temperature range is optimum, 375–395° C. is perfectly acceptable.

The quantity of high boiling side products was, furthermore, reduced by use of the promoted material.

*Example 3.*—This example shows about the maximum yield obtainable with a catalyst promoted by impregnation with the potassium ion.

Approximately 2250 grams of catalyst pellets consisting of 90 mole percent zinc chromite and 10 mole percent of iron chromite were treated with a solution of about 40 grams of potassium carbonate in 1200 cc. of water. The mixture was allowed to stand for three minutes and the excess liquor decanted therefrom. The catalyst was then utilized as before in a decarbonylation reaction. The temperature used to maintain the theoretical ratio of permanent off-gas to furfural was 380–390° C.

Analysis showed the offgas to contain, by volume, 49.3% of $CO_2$, 0.7% of CO and 0.4% of unsaturated hydrocarbons. Distillation of the combined crude product showed a 92.1% conversion of furfural to furan. The total high boiling materials formed represented 2.6 grams for each mole of furan secured.

*Example 4.*—This example shows use of the preferred catalyst of the invention.

A zinc-iron mixed chromite catalyst, with a molar ratio of 90:10 zinc to iron, was prepared according to a modification of the procedure of Whitman's Example I. After precipitating, drying and igniting, but prior to blending in graphite and compressing the catalyst powder, 300 pounds were charged to a conventional kneader. A solution of 5.41 pounds of potassium carbonate of 99% purity in 26 gallons of water was added, with kneading, at 30–40° C. over a period of 20 minutes. The solution tank and feed lines were rinsed with 2 gallons of water and the rinsings added to the kneader. The mixture was kneaded for 20 minutes longer, blended with 1%–2% graphite used as a lubricant and then compressed to 3/16" pellets. Analysis showed a promoter content of 1.4% calculated as potassium carbonate.

The activated material was inserted in the 1" x 10' stainless steel coil as in previous runs and a mixture of 10 volumes of steam and 1 volume of furfural passed therethrough at a rate of about 950–1050 v./v./h. (S. T. P.). The reaction temperature was varied from run to run to find the optimum. The furan produced was determined according to the method described above, the yields again being based on a single passage of furfural through the reactor. Results for a series of runs are set forth in:

*Table II.—Use of chromite catalyst carrying potassium ion incorporated therein*

| Run | Temperature (°C.) | Percent Yield (Furan) | High Boiling Fraction |
|---|---|---|---|
| 10 | 372–374 | 91.5 | 1.81 |
| 11 | 376–381 | 92.8 | 2.06 |
| 12 | 382–385 | 93.0 | 1.65 |
| 13 | 408–410 | 90.8 | 2.57 |

It will be seen that the use of chromites carrying potassium carbonate incorporated therein improved the yield from the 87–88% obtained with unpromoted catalyst or the 92.1% with the impregnated catalyst to 93%. In addition, the catalyst carrying the potassium incorporated therein was found to give a much longer production cycle than one merely impregnated with the promoter. The production cycle is that period in the active life of a catalyst between successive burn-outs of the catalyst. The burn-outs are reactivations with oxygen at elevated temperature to remove carbon deposited on the catalyst.

*Example 5.*—This example shows the effect of varying the steam:furfural ratio and the space velocity.

A run was made at an 8.0–8.3:1 steam:furfural ratio and a space velocity of 720–730 v./v./h. An air bath was used as the heating medium. A yield of 91.9% in the temperature range 382–387° C. was obtained, checking closely with the run of Example 3 above. Similar results may be obtained at space velocities up to about 1300 v./v./h. and steam:furfural ratios of up to about 11:1. The ratio may actually be varied from the theoretical 1:1 up to about 13:1.

*Example 6.*—This example shows the effect of substituting potassium hydroxide for potassium carbonate in forming an impregnated catalyst.

Zinc-iron chromite (90:10 ratio) was treated with a solution of 34 grams KOH in 1200 ml. $H_2O$ to give a potassium ion equivalent to that from about 0.65% $K_2CO_3$. The maximum yield of furan obtained with this catalyst, 91.3% at 378–383° C., compares favorably with the yields from $K_2CO_3$ promoted catalysts. Potassium hydroxide can thus be substituted for potassium carbonate. Analysis showed that the off-gas contained, by volume, 49.6% of $CO_2$, 0.8% of CO and 0.3% of unsaturated hydrocarbons. High boiling materials were in the neighborhood of 3.3 grams per mole of furan formed.

*Example 7.*—This example shows use of the lithium ion rather than the potassium ion as a promoter.

Zinc-iron chromite (90:10 ratio) was treated twice in the reaction tube with a solution of 11 grams of lithium carbonate in 1200 ml. $H_2O$, drying being utilized between the two treatments. Two treatments were required because $Li_2CO_3$ is only slightly soluble in water. The deposit of lithium finally obtained was equal in molar concentration to that of the alkali ion from the 0.6–0.7% potassium carbonate catalysts. The yield of 86% furan at 385–395° C. resulting from a decarbonylation run with this catalyst may be compared with 90.4% from the potassium treated catalysts under the same conditions. The promoting effect of the potassium carbonate shown above is thus seen as due to the positive and not to the carbonate ion.

*Example 8.*—This example shows use of the sodium ion as a promoter.

2200 grams of mixed zinc-iron chromite catalyst of 90:10 mole ratio were allowed to stand in a solution containing approximately 32 grams sodium carbonate in 1200 cc. of water for about 3 minutes. The excess liquor was decanted and a sample of the catalyst analyzed. The weight of sodium ion in the catalyst was found equivalent to the potassium ion in about 41 grams of potassium carbonate.

A decarbonylation was carried out at 380°–390° C., yielding an off-gas containing, by volume, 49.1% of $CO_2$; 1.1% of CO and 0.4% of unsaturated hydrocarbons. Distillation of the product showed a 90.3% conversion of furfural to furan with high boiling material in the ratio of 3.9 grams per mole of furan. The sodium ion was thus also effective in promoting the activity of the chromite catalyst. Comparison with the lithium of Example 7 and also with potassium shows that the heavier alkali metal ions are somewhat more effective than the lighter.

OPERATIONAL VARIABLES

The foregoing examples have illustrated in detail some of the preferred aspects of this invention. It is understood, however, that the invention is not limited to these particular embodiments. Several modifications and equivalents are at once apparent to those skilled in the art. For example, instead of zinc-iron chromite catalyst of mole ratio 90:10, a zinc-iron chromite catalyst of any mole ratio initially suitable to affect a reasonably satisfactory decarbonylation of the aldehyde may be used, as for instance a zinc-iron chromite of mole ratio 80:20. Other initially suitable mixed metal-chromites such as a zinc-manganese chromite of mole ratio 99:1 may also be employed in place of the zinc-iron chromite exemplified.

While the weight of promoter has been specified in terms of the potassium carbonate added, no theory as to the actual existence of the carbonate in the catalyst is maintained. Analyses made after even very slight use of the catalyst show that little if any carbonate is present. The potassium or other promoter must therefore be combined as some other compound such as the chromate or chromite. Weights in terms of potassium carbonate can easily be converted to weights in terms of the potassium ion by utilization of conventional gravimetric factors as will readily be understood. Preferred and optimum weights of potassium can also be converted to the corresponding weights of sodium or other alkali metal by the use of such factors. Actual figures for preferred and optimum weight ranges are given above.

It is not to be assumed that the optimum promotional concentrations are the same for all alkali metal ions. They may, in fact, vary from ion to ion. Preferred and optimal concentrations may also vary slightly with changes in the mole ratio of the mixed zinc-iron chromite catalyst and more particularly with major changes in the catalyst itself as from a zinc-iron chromite to a manganese-iron chromite.

Since the added alkali metal carbonate does not exist as such to any great extent in the active catalyst, it is immaterial which alkali metal compound is actually used. It is, of course, necessary that no harmful negative ion be added along with the alkali metal ions. Suitable compounds, however, include the alkali metal oxides, hydroxides, carbonates and salts of feeble organic acids.

The activating ingredient selected can be added to the catalyst at substantially any step in its manufacture. Impregnation of the pelletized material is possible, as exemplified. Consistent results are, however, more easily obtained by the preferred incorporation of the promoter in the mixed powder obtained, as described by Whitman, by precipitation of zinc and iron chromites in the correct ratio with ammonia. The promoter may be added as a dry powder to the zinc-iron chromite but preferably is added as an aqueous solution. The catalyst is then dried and compressed into pellets of the desired size. Up to about 2% of graphite is preferably incorporated in the catalyst as a lubricant to prevent wearing of the dies used in pelletizing.

The temperature in the process employing the catalyst should be chosen for maximum yield and minimum byproduct formation with as nearly complete disappearance of the furfural as possible. Lower temperatures in general tend to give lesser amounts of by-products than higher. It should therefore be noted that the promoted catalyst permits use of lower temperatures for more nearly complete decarbonylation than have heretofore been found satisfactory. Thus a preferred range is 375–395° C. while about 380–390° C. is optimum. These temperature ranges are, however, applicable primarily to a one-inch diameter reactor. Higher temperatures may be required if larger reactors are employed. For the same reactor, however, substitution of promoted for unpromoted catalyst will lower the reaction temperature several degrees and thus decrease the amount of by-products formed. If greatly impaired conversions are acceptable, temperatures of as low as 300° C. can be used.

It will be seen from the foregoing examples and discussion that the promoted catalyst affords improved conversion of furfural to furan. This result is probably due to the lower reaction temperature usable with the new catalyst. As noted above, relatively lower reaction temperatures tend to reduce decomposition of furan and other side reactions and thus increase conversion to the desired material. The inventor, however, is not to be bound by this theoretical explanation of observed results.

Having described my invention, I claim:

1. The method of enhancing the catalytic effect of a catalyst adapted for the decarbonylation of furfural, said catalyst consisting essentially of a mixture of zinc and iron chromites in which the zinc:iron mole ratio is between about 1:1 and 9:1, which comprises supplying thereto between about 0.1 and 5% by weight of a promoter of the group consisting of sodium and potassium ions, said weight being based on the weight of the mixture and calculated as potassium carbonate.

2. The invention of claim 1 in which the zinc:iron mole ratio is about 9:1, the promoter supplied thereto is potassium carbonate, and the weight of said promoter is 0.1–3% of the weight of the mixture.

3. The invention of claim 1 in which the zinc:iron mole ratio is about 9:1, the promoter supplied thereto is sodium carbonate, and the weight of said promoter is 0.1–3% of the weight of the mixture.

4. A catalyst adapted for the decarbonylation of furfural consisting essentially of mixed zinc and iron chromites in which the zinc:iron mole ratio is between about 1:1 and 9:1 carrying between about 0.1 and 5% by weight of a promoter of the group consisting of sodium and potassium ions, said weight being based on the weight of the mixed chromites and calculated as potassium carbonate.

5. The invention of claim 4 in which the zinc-iron mole ratio is about 9:1, the promoter is potassium supplied as the carbonate and the weight of said promoter is 0.1–3% of the weight of the mixed chromites.

6. The invention of claim 4 in which the zinc:iron mole ratio is about 9:1, the promoter is sodium supplied as the carbonate and the weight of said promoter is 0.1–3% of the weight of the mixed chromites.

7. The process for the production of furan which comprises contacting, at a temperature of about 300–450° C., a vapor mixture of furfural and steam with a promoted mixed chromite catalyst, said catalyst consisting essentially of zinc and iron chromites in the zinc:iron mole ratio of between about 1:1 and 9:1 carrying between about 0.1 and 5% by weight of a promoter of the group consisting of sodium and potassium ions, the weight of the promoter being based on the weight of the chromites and calculated as potassium carbonate.

8. The process for the production of furan which comprises contacting, at a temperature of about 300–450° C., a vapor mixture of furfural and steam with a zinc:iron chromite catalyst having a zinc:iron mole ratio of about 9:1 promoted with about 0.1–3% by weight of the potassium ion, said weight being based on the weight of the chromite and calculated as potassium carbonate.

9. The process of claim 8 in which the temperature is about 375–395° C.

10. The process of claim 8 in which the mole ratio of steam to furfural is in the range of 1–13:1.

11. The process for the production of furan which comprises contacting, at a temperature of about 300–450° C., furfural and steam with a zinc:iron chromite catalyst having a zinc:iron mole ratio of about 9:1 and promoted with about 0.1–3% by weight of the sodium ion, said weight being based on the weight of the chromite and calculated as potassium carbonate.

12. The process of claim 11 in which the mole ratio of steam to furfural is in the range of 1–13:1.

References Cited in the file of this patent

UNITED STATES PATENTS

| | | |
|---|---|---|
| 2,364,562 | Stowe | Dec. 5, 1944 |
| 2,374,149 | Whitman | Apr. 17, 1945 |
| 2,408,140 | Gutzut | Sept. 24, 1946 |
| 2,418,888 | Kearby | Apr. 15, 1947 |
| 2,634,276 | Carnahan | Apr. 7, 1953 |

FOREIGN PATENTS

| | | |
|---|---|---|
| 575,362 | Great Britain | Feb. 14, 1946 |